Dec. 29, 1964  G. DIRIAN ETAL  3,163,589
PROCESS FOR RECOVERING THE CATALYST IN AN INSTALLATION
FOR THE ENRICHMENT OF A HYDROGENATED
COMPOUND IN DEUTERIUM
Filed Aug. 2, 1960  6 Sheets-Sheet 1

INVENTORS
GRÉGOIRE DIRIAN
HENRI SACK
BY
Bacon & Thomas
ATTORNEYS

INVENTORS
GRÉGOIRE DIRIAN
HENRI SACK
BY
ATTORNEYS

INVENTORS
GRÉGOIRE DIRIAN
HENRI SACK
BY Bacon & Thomas
ATTORNEYS

United States Patent Office 3,163,589
Patented Dec. 29, 1964

3,163,589
PROCESS FOR RECOVERING THE CATALYST IN AN INSTALLATION FOR THE ENRICHMENT OF A HYDROGENATED COMPOUND IN DEUTERIUM
Grégoire Dirian, Palaiseau, and Henri Sack, Le Raincy, France, assignors to Houilleres du Bassin du Nord et du Pas-de-Calais, Douai, France, a French public establishment, and Commissariat á l'Energie Atomique, Paris, France
Filed Aug. 2, 1960, Ser. No. 46,992
Claims priority, application France, Aug. 6, 1959, 802,163, Patent 1,241,260
5 Claims. (Cl. 204—59)

It is known that an excellent method for the enrichment in deuterium of a hydrogenated compound such as ammonia is the $NH_3$—$H_2$ isotopic exchange with hydrogen gas containing deuterium. Such a process is disclosed in Delassus et al. application Ser. No. 34,268, filed on June 7, 1960. This exchange must be activated by a catalyst. The conditions for the economic carrying out of this process consist in utilizing the same catalyst for numerous cycles. There result from this numerous schemes for the complicated devices for the recycle of the catalyst. The most simple methods to this effect consist of:

(a) Isolating the catalyst after complete evaporation of the ammonia which contains it, then reintroducing it into the ammonia before it is submitted to isotopic exchange.

(b) Partially evaporating the ammonia which contains the catalyst, then introducing the concentrate thus obtained into the ammonia before it is submitted to isotopic exchange.

(c) Evaporating as in (a) all the ammonia, but then putting the catalyst into the form of a suspension by the introduction of a liquid substance not susceptible of being appreciably entrained with the ammonia during the evaporation of the latter and then reintroducing this suspension into the ammonia to be submitted to isotopic exchange; it being clearly understood that this liquid substance must be selected from amongst those which are chemically inert with respect to ammonia and to the catalyst.

The most suitable catalysts for carrying out this isotopic exchange are alkali metal amides which are soluble in the ionized state in liquid ammonia. For this class of catalysts, in particular, recycling by the methods (a), (b) or (c) mentioned above involves the following very serious disadvantage: these substances contain constitutive hydrogen atoms with which isotopic exchange with the deuterium atoms of the ammonia or of the gaseous hydrogen is particularly easy; it results from this that the isotopic constitution of the constitutive hydrogen of these amides is at each instant a function of the corresponding isotopic composition of the ammonia in which they were in solution. Their transfer to ammonia of isotopic composition necessarily different from the first causes mixtures of concentrations which it is known are harmful to the yield and/or the enrichment obtained by the process.

The object of the present invention is to allow this recycling of the alkali metal, constituting the amide, only, in exclusion in particular of the hydrogen atoms, responsible for the isotopic pollutions mentioned above, this being done by a continuous process. This process further has the advantage of avoiding the isolation and the manipulation of the alkali metals, which manipulations are often inconvenient and dangerous.

This process consists essentially in terminating an isotopic exchange cycle by transferring the alkali metal constituting the amide which has served as the catalyst, from this amide into mercury in order to form an amalgam. This transfer is effected by electrolysis on a mercury cathode. The amalgam is used as the anode in a second electrolytic cell containing ammonia as the solvent electrolyte. The isotopic grade of this ammonia is lower than that of the solvent of the first electrolyzer, the ratio of the two isotopic compositions being a function of the enrichment installation, and is generally between 5 and 10,000, preferably between 10 and 1,000. In the case where the solvents of the two electrolyzers are ammonia, the temperature of the electrolysis is between $-30°$ C. and $+100°$ C., preferably between $+10°$ C. and $+40°$ C.

In the case where the solvent of the first electrolyzer is water, the temperature is clearly limited in the downwards direction by the freezing temperature of the aqueous solution utilised. It is clearly understood that the temperatures of the two electrolyzers are not necessarily the same.

In a first method for carrying out the process forming the object of the invention, the ammonia rich in deuterium coming from the installation for enrichment by $NH_3$—$H_2$ isotopic exchange and containing in solution the alkali metal amide is electrolyzed in an electrolytic cell of appropriate form in which the cathode is formed by the amalgam of the alkali metal and the anode by a conductive body, such as carbon for example. Depending on the alkali metal employed and the operating conditions, the ammonia can contain from 0.05% to 50% of the amide by weight and the amalgam from 0.05 to 2% of the alkali metal by weight.

If a potential difference is applied to the terminals of the electrolyzer, the alkali metal formed at the cathode passes into the form of an amalgam with the mercury. The potential difference employed depends on the operating conditions and can vary in practice from about 1 to 8 volts, the current density being between about 5 and 50 amperes per square decimetre.

All the amide contained in the ammonia cannot clearly be eliminated by simple electrolysis, the resistivity of the electrolysis bath increasing in proportion to its improverishment in the amide. There is then drawn off from the electrolyzer a solution improverished in amide which is submitted to a partial evaporation, for example in an evaporator. The ammonia evaporated, and thus completely freed of the amide, is condensed and sent back at an appropriate point of the enrichment installation. A reconcentrated solution of the amide is drawn off from the evaporator and returned into the electrolyzer for electrolysis. A second possible method consists of combining in the electrolyzer the two functions of electrolysis and evaporation. To this end, the electrolyzer is heated externally or internally by any appropriate means, such as steam heating coils, electrical resistances, etc., and there is drawn off directly from the electrolyzer in the form of vapour, the ammonia freed from the amide. In certain cases, the calorific contribution of the electrolysis current is sufficient to ensure the evaporation. This vapour is condensed and the liquid ammonia formed is returned to the enrichment installation.

The amalgam is drawn off continuously from the first electrolyzer and sent into a second electrolyzer containing a solution of the alkali amide for rendering conductive the ammonia which contains it, and there is sent there at least a part of the ammonia poor in deuterium before serving as the feed to the enrichment installation. The amalgam this time serves as the anode, the cathode consisting of an appropriate conductive body. The operating conditions are substantially the same as in the first electrolyzer. The cathode and the walls of the electrolyzer can be of materials favouring the reaction of potassium with ammonia form the amide, such as iron, platinum, etc., or can be covered with a catalytic material favouring this reaction, such as oxides of iron or of titanium, platinum black, etc. In this case, when the voltage is applied to the terminals of the electrolyzer, the alkali metal enters into solution in the ammonia and is converted, in the same electrolyzer, into a solution of the amide which is drawn off and is sent to the enrichment installation. On the other hand, it may be desired to avoid the formation of the amide in the electrolyzer. For this, on the contrary, the use of catalytic substances will be avoided. The liquid drawn off will be a solution of the alkali metal in ammonia possibly containing traces of amides which would nevertheless be formed. This solution will be sent into a separate receiver containing the substance catalyzing the conversion of the alkali metal into its amide. This conversion would take place there and the solution of the amide will then be sent to the enrichment installation.

The amalgam of the alkali metal in the second electrolyzer is impoverished in alkali metal. It is drawn off from the electrolyzer continuously and returned to the first electrolyzer where it is recharged with alkali metal before being sent again to the second electrolyzer.

According to a second method, the amide contained in the ammonia leaving the enrichment installation can be destroyed with a small quantity of water. The concentrated solution of alkali metal hydroxide thus formed is slightly soluble in ammonia and can be drawn off by decanting or by any other appropriate means. The ammonia is then returned to the enrichment installation while the solution of alkali metal hydroxide is sent to an electrolyzer having as cathode an amalgam of the alkali metal. The alkali metal is extracted from its hydroxide by electrolysis and the amalgam formed is sent into a second electrolyzer, the rest of the operation then being the same as that described above.

The invention will now be described in more detail with reference to the accompanying drawings, in which.

Figure 1:
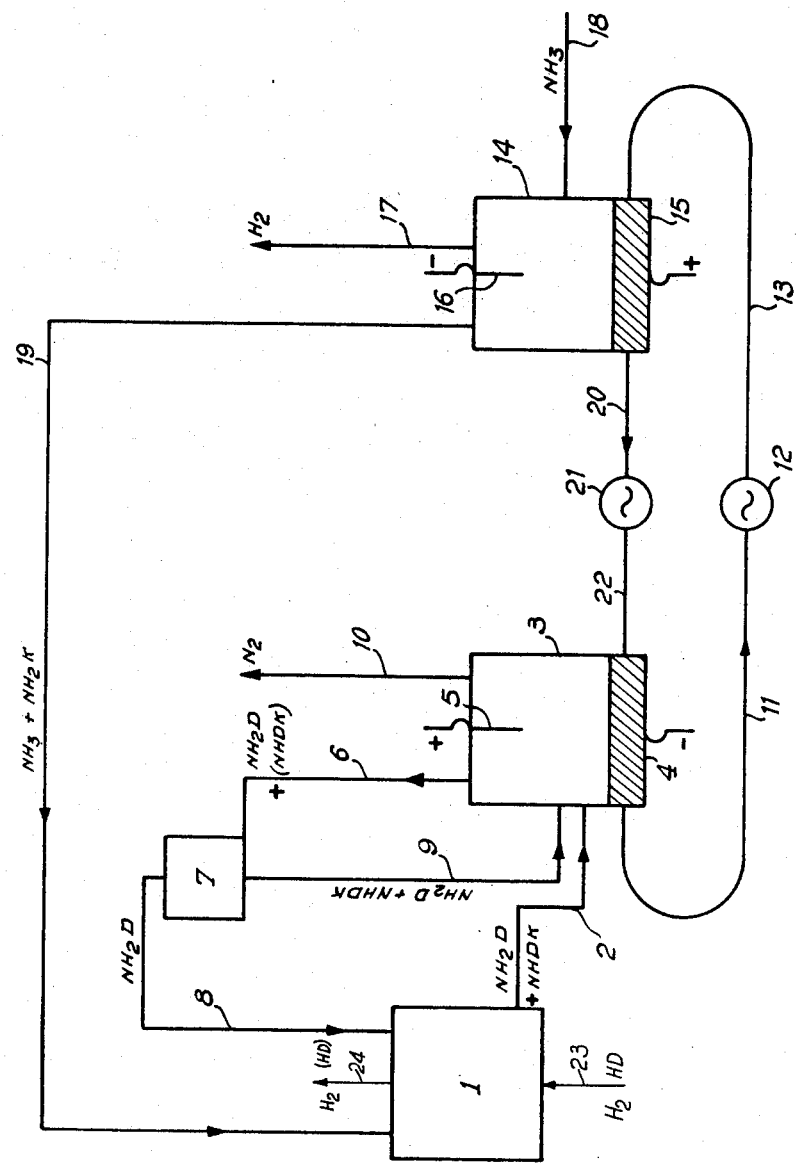
FIG. 1 illustrates the case where an evaporator separate from the first electrolyzer is employed, and the alkali metal amide is formed directly in the second electrolyzer.

In FIG. 1, the enrichment installation or part of the enrichment installation is schematically represented by the square 1. The hydrogen gas stream containing deuterium ($H_2$/HD) enters the enrichment installation 1 through tube 23 and leaves substantially depleted of its deuterium content through tube 24, symbolized by the fact that HD is now shown in brackets in the figures. There is drawn off through a tube 2 the ammonia and the amide of the alkali metal supposed, in this case, to be potassium. In order to make it clear that these substances are relatively rich in deuterium, they are marked HD, $NH_2D$ and NHDK. Through the tube 2 the solution of NHDK is sent into an electrolyzer 3 of which the cathode 4 is an amalgam of potassium and the anode 5 is an appropriate conductive body. If a suitable potential difference is applied to the electrodes, the potassium contained in the electrolyte passes into the amalgam forming the cathode 4. There is drawn off from the electrolyzer 3 a solution much poorer in NHDK (symbolized by the fact that NHDK is now in brackets in the figure) which is sent through the tube 6 to an evaporator 7 heated by any appropriate means where the solution is partially evaporated. The evaporated ammonia $NH_2D$, now freed of its amide, is returned through the tube 8 and, after possible condensation not shown in the figure, to a convenient point of the installation or the part of the installation 1. There is drawn off from the evaporator 7 a solution concentrated in NHDK which is returned to the electrolyzer 3 through the tube 9.

The nitrogen which is released at the anode 5 of the electrolyzer 3 is evacuated through the tube 10 and sent to an appropriate point (not shown in the figure) of the installation (or part of the installation) 1 or to a plant for the synthesis of ammonia.

The amalgam coming from the cathode 4, which is enriched in potassium, is drawn off from the electrolyzer 3 through the tube 11. A pump 12 and a tube 13 send it to a second electrolyzer 14 where it serves this time as the anode 15. The cathode 16 and/or the walls of the electrolyzer 14 are constituted by materials favouring the formation of potassium amide. If a suitable potential difference is applied to the electrodes, the potassium passes from the amalgam constituting the anode 15 to the ammonia contained in the electrolyzer 14 and is converted into potassium amide. The hydrogen, released by the reaction of the potassium with the ammonia, is evacuated through tube 17 and is sent to an appropriate point (not shown in the figure) of the installation or the part of the installation 1 or to a plant for the synthesis of ammonia. Ammonia relatively poor in deuterium (symbolized on the figure by $NH_3$) is sent continuously into the electrolyzer 14 through the tube 18. There is drawn off from the electrolyzer 14 a solution rich in potassium amide ($NH_3 + NH_2K$) which is sent through the tube 19 to the installation or the part of the installation 1.

The amalgam coming from the anode 15 which is poor in potassium is drawn off from the electrolyzer 14 through the tube 20 and pump 21. Tube 22 then sends it to the electrolyzer 3 where it is recharged with potassium.

Figure 2:
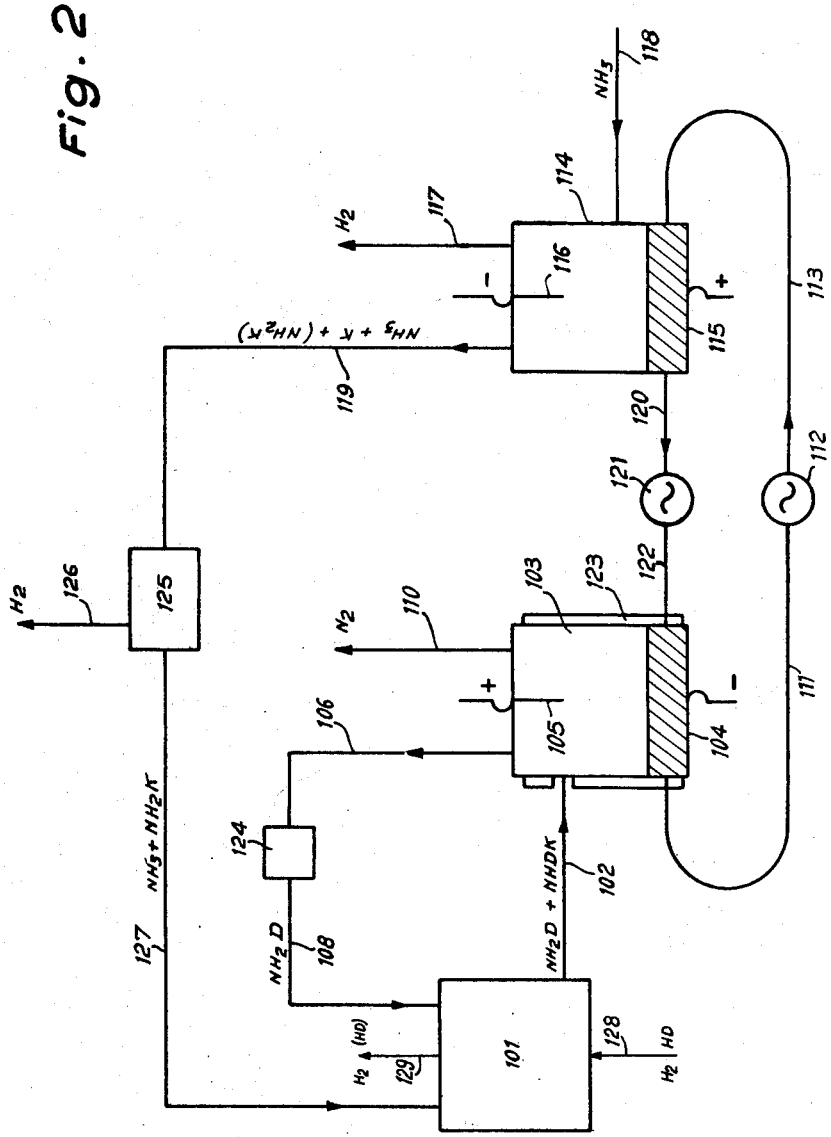
FIG. 2 illustrates the case where the first electrolyzer serves at the same time as an evaporator, and the amide is formed in a receiver separate from the second electrolyzer.

In FIGURE 2, the enrichment installation or part of the installation is schematically represented by the square 101. The hydrogen gas stream containing deuterium ($H_2$/HD) enters enrichment installation 101 through tube 128 and leaves substantially depleted of its deuterium content through tube 129. There are drawn off through a tube 102 the ammonia and the amide of the alkali metal which, in this case is potassium (in the figure: $NH_2D$+NHDK). Through the tube 102 the solution of NHDK is sent into an electrolyzer 103 fitted with appropriate heating means; in this embodiment shown as a heating jacket 123. The electrolyzer 103 is provided with a cathode 104, which is an amalgam of potassium, and an anode 105. If a suitable potential difference is applied to the electrodes, the potassium contained in the electrolyte passes into the amalgam forming the cathode 104.

The heat applied by the jacket 123 is controlled in such a manner as to draw off from the electrolyzer 103 the ammonia $NH_2D$ in vapour form through the tube 106. This ammonia, which is thus freed of potassium amide NHDK, is condensed in the condenser 124 and the liquid formed is returned to the installation or the part of the installation 101 through the tube 108.

The nitrogen which is released at the anode 105 of the electrolyzer 103 is evacuated through the tube 110 and sent to an appropriate point (not shown in the figure) of the installation or the part of the installation 101 or to a plant for the synthesis of ammonia.

The amalgam coming from the cathode 104, which is enriched in potassium, is drawn off from the electrolyzer 103 through the tube 111. A pump 112 and a tube 113 send it to a second electrolyzer 114 where it serves this time as the anode 115. The cathode 116 and the walls of the electrolyzer 114 this time consists of materials which do not favour the conversion of the potassium into potassium amide. If a suitable potential difference is applied to the electrodes, the potassium passes from the amalgam constituting the anode 115 to the ammonia in the electrolyzer 114. Ammonia relatively poor in deuterium ($NH_3$ in the figure) is sent continuously into the electrolyzer 114 through the tube 118. As, in practice, it is impossible completely to avoid the conversion in the electrolyzer 114 of the potassium into potassium amide, a small release of hydrogen takes place at the cathode 116. The tube 117 permits the hydrogen formed to be evacuated and sent to an appropriate point (not shown in the figure) of the installation or part of the installation 101 or to a plant for the synthesis of ammonia.

Through the tube 119 there is drawn off continuously from the electrolyzer 114 a concentrated solution of potassium in ammonia, containing a little potassium amide ($NH_3+K+(NH_2K)$ in the figure), which is sent into an appropriate receiver 125 containing materials catalyzing the formation of potassium amide. The hydrogen which results therefrom is evacuated through the tube 126 in a similar manner to that evacuated from the electrolyzer 114.

From the receiver 125 there is drawn off a solution of potassium amide which is sent through the tube 127 to an appropriate point of the installation 101. The amalgam coming from the anode 115, which is poor in potassium, is drawn off from the electrolyzer 114 through the tube 120 and pump 121. The tube 122 then sends it to the electrolyzer 103 where it is recharged with potassium.

Figure 3:
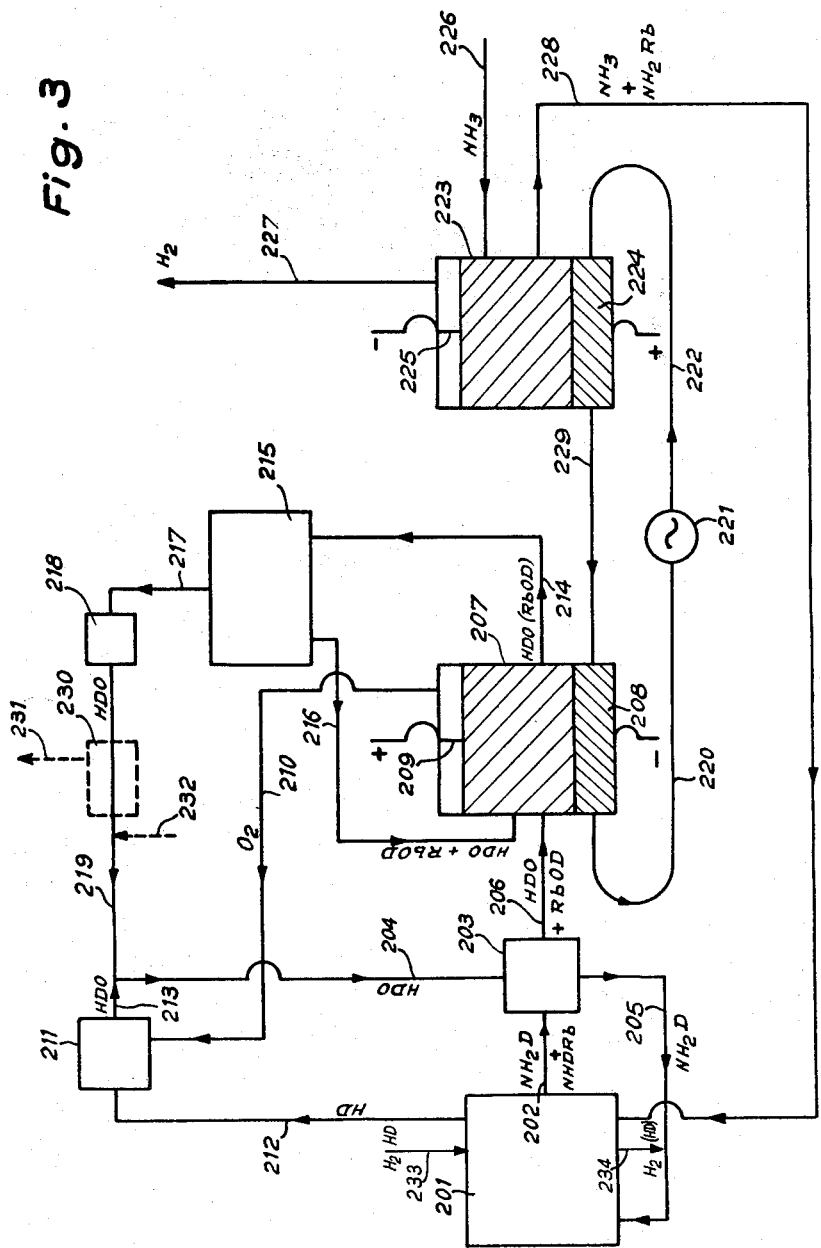
FIG. 3 illustrates the case where the amide is first of all destroyed with water, the resulting aqueous solution of alkali metal hydroxide being submitted to electrolysis.

In FIG. 3, the enrichment installation or part of the installation is schematically represented by the square 201. The hydrogen gas stream containing deuterium ($H_2/HD$) enters enrichment installation 201 through tube 233 and leaves substantially depleted of its deuterium content through tube 234. There are drawn off through a tube 202 the ammonia rich in deuterium and the amide of the alkaline metal which, in this case is rubidium ($NH_2D+NHDRb$ in the figure) and they are fed into a mixer-separator 203 where they are put into contact with a small quantity of water rich in deuterium (symbolized by HDO) entering through the tube 204. The origin of this water will become clearer in the rest of this description. In the apparatus 203, the rubidium amide reacts with the water, which is in slight excess with respect to the quantity theoretically necessary; the concentrated solution of rubidium hydroxide which results therefrom is separated from the ammonia, the latter thus being freed from its amide. This ammonia, rich in deuterium ($NH_2D$), returns to the installation 201 through the tube 205. The concentrated solution of rubidium hydroxide is directed through the tube 206 to the electrolyzer 207. The latter is provided with a cathode 208 which consists of an amalgam of rubidium and an anode 209. By application of a suitable potential difference to the electrodes, the rubidium contained in the electrolyte passes into the amalgam constituting the cathode 208.

The oxygen which is released at the anode 209 of the electrolyzer 207 is collected by the tube 210. It can advantageously be utilized for producing the water intended for the conversion of the rubidium amide into hydroxide in the apparatus 203. For this purpose, it is fed to the recombination device 211 where it is converted into water by reaction with hydrogen rich in deuterium (HD) which can come from the installation 201 through the tube 212. This recombination device is of known type, utilizing for example a catalyst with a divided platinum base. The water thus formed in this recombination device, rich in deuterium (HDO), is collected by the tube 213.

Under these conditoins, its quantity is insufficient to ensure the conversion of the rubidium amide into hydroxide in the apparatus 203. The fraction which it lacks to ensure this conversion, as well as the slight excess of water necessary for the formation in 203 of a concentrated solution of hydroxide, are obtained by re- cycling a small fraction of the water rich in deuterium contained in the electrolyzer 207. For this purpose, the electrolyte contained in 207 is drawn off through the tube 214 and directed to the evaporator 215, where the desired fraction of water is evaporated; the resultant solution, slightly more concentrated than the solution introduced, is drawn off through the tube 216 and returned to the electrolyzer 207; the evaporated water is recovered through the tube 217 and, after passage into a condenser 218 from which it leaves through a tube 219, is directed to the apparatus 203 through the tube 204, at the same time as the water formed in the recombination device 211 which arrives through the tube 213.

The amalgam coming from the cathode 208, which is enriched in rubidium, is drawn off from the electrolyzer 207 through the tube 220. A pump 221 and a tube 222 send it to a second electrolyzer 223, where it serves, this time, as the anode 224. The cathode 225 and the walls of the electrolyzer 223 are, as in the case of FIG. 1, formed of materials favouring the conversion of rubidium into rubidium amide. If a suitable potential difference is applied to the electrodes, the rubidium passes from the amalgam constituting the anode 224 into the electrolyte contained in the electrolyzer 223. There is sent continuously into the electrolyzer 223, through the tube 226, ammonia which is relatively poor in deuterium ($NH_3$ in the figure). The hydrogen released by the reaction of the rubidium with the ammonia is evacuated through the tube 227 and is sent to an appropriate point (not shown in the figure), of the installation or part of the installation 201, or to a plant for the synthesis of ammonia. There is drawn off from the electrolyzer 223 through the tube 228 a solution rich in rubidium amide ($NH_3+NH_2Rb$) which is sent to the installation or the part of the installation 201.

The amalgam coming from the anode 224, which is poor in rubidium, is drawn off from the electrolyzer 223 and sent through the tube 229 (and optionally through a pump which is not shown in the figure) to the electrolyzer 207 where it is recharged with rubidium.

An appreciable advantage of the arrangement shown in FIGURE 3 is as follows: when it is desired to apply the enrichment method herein described to the production of heavy water, it can be very advantageous to draw off the enriched product directly in the form of water and thus avoid chemical conversions. The drawn off water can be submitted to a more powerful enrichment by conventional methods such as distillation. This possibility has been indicated in FIG. 3 by the rectangle 230 symbolizing a device for the distillation of the water leaving the condenser 218; the drawing off of the very enriched water would then be made at 231, and the quantity drawn off must then be compensated by make-up water at 232.

In order to illustrate that which has been stated above, there will now be described three practical examples according to the present invention.

Figure 4:
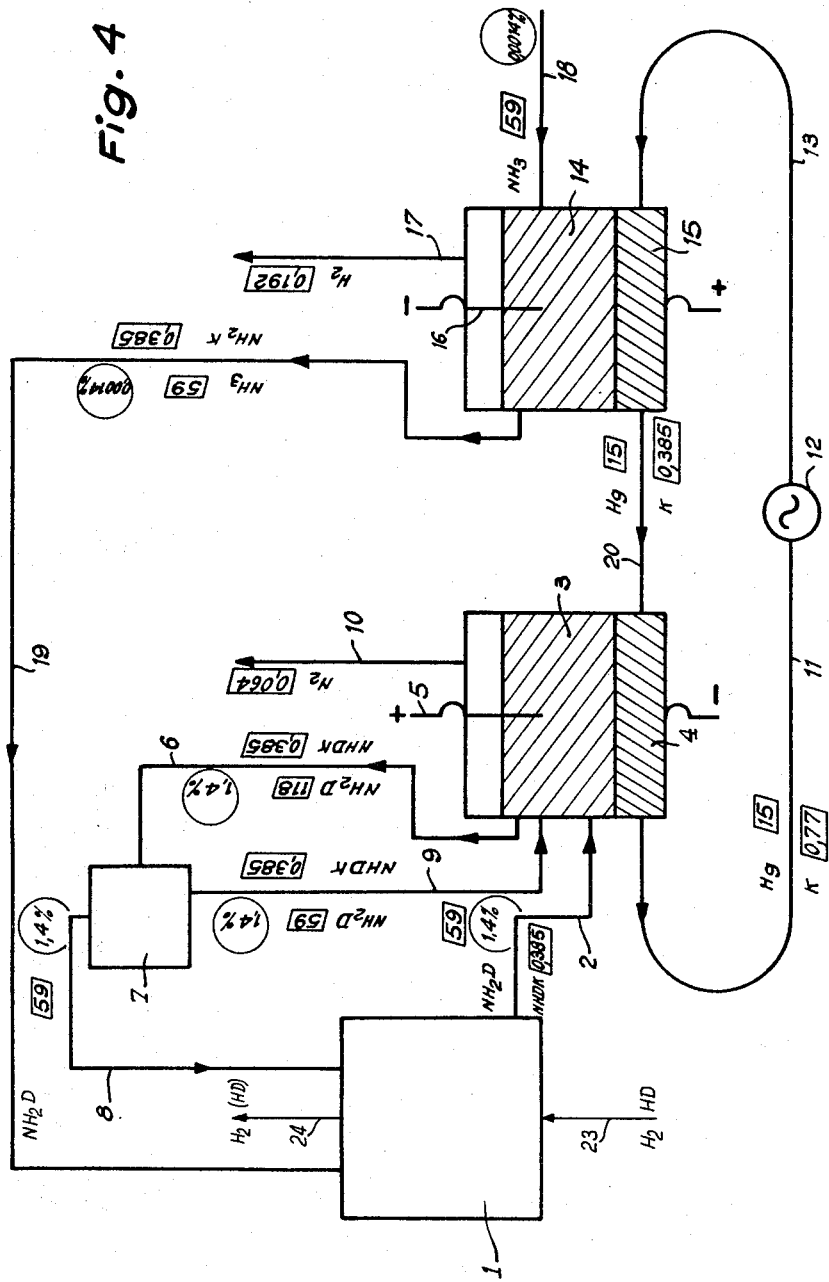
FIGS. 4 to 6 illustrate examples of the practical execution of the three variants forming the object of the schemes of FIGS. 1 to 3.
Figure 5:
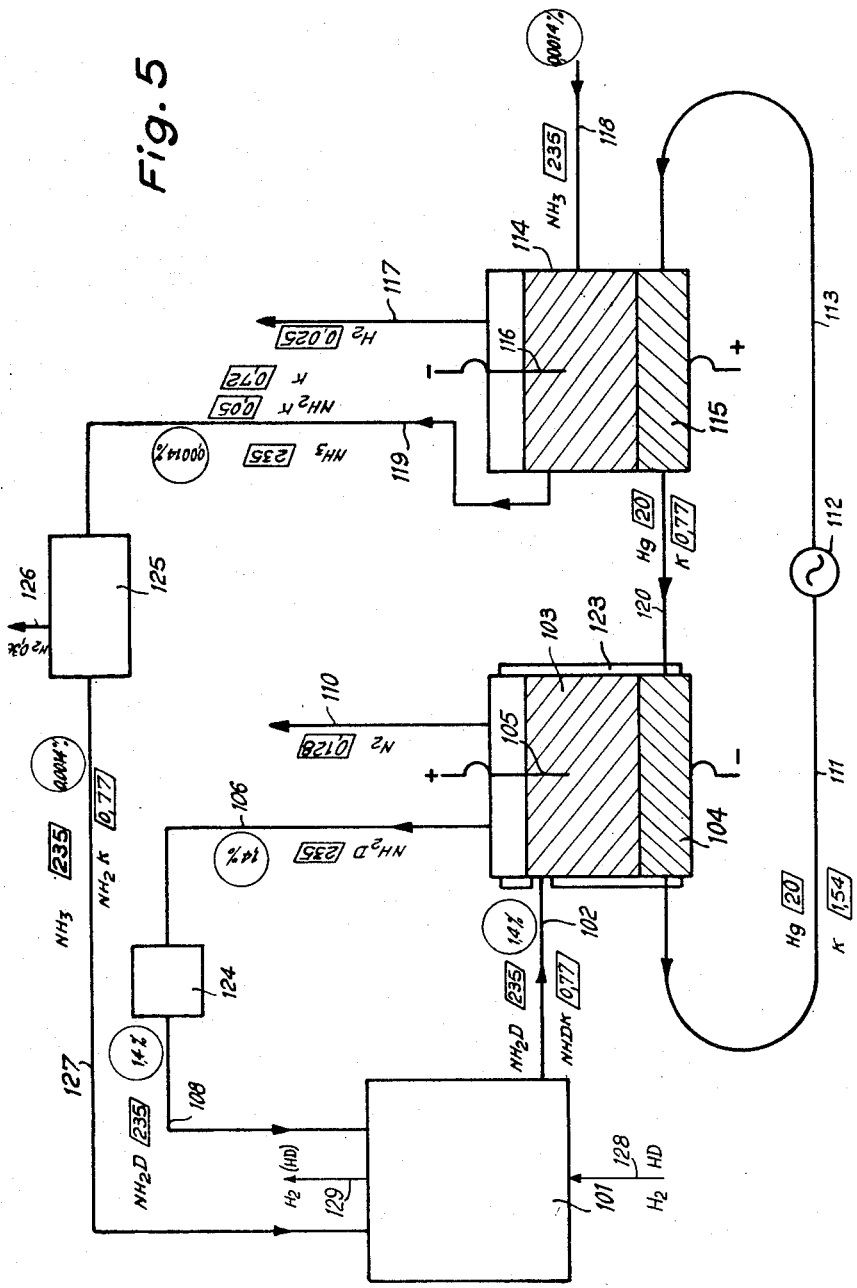
Figure 6:
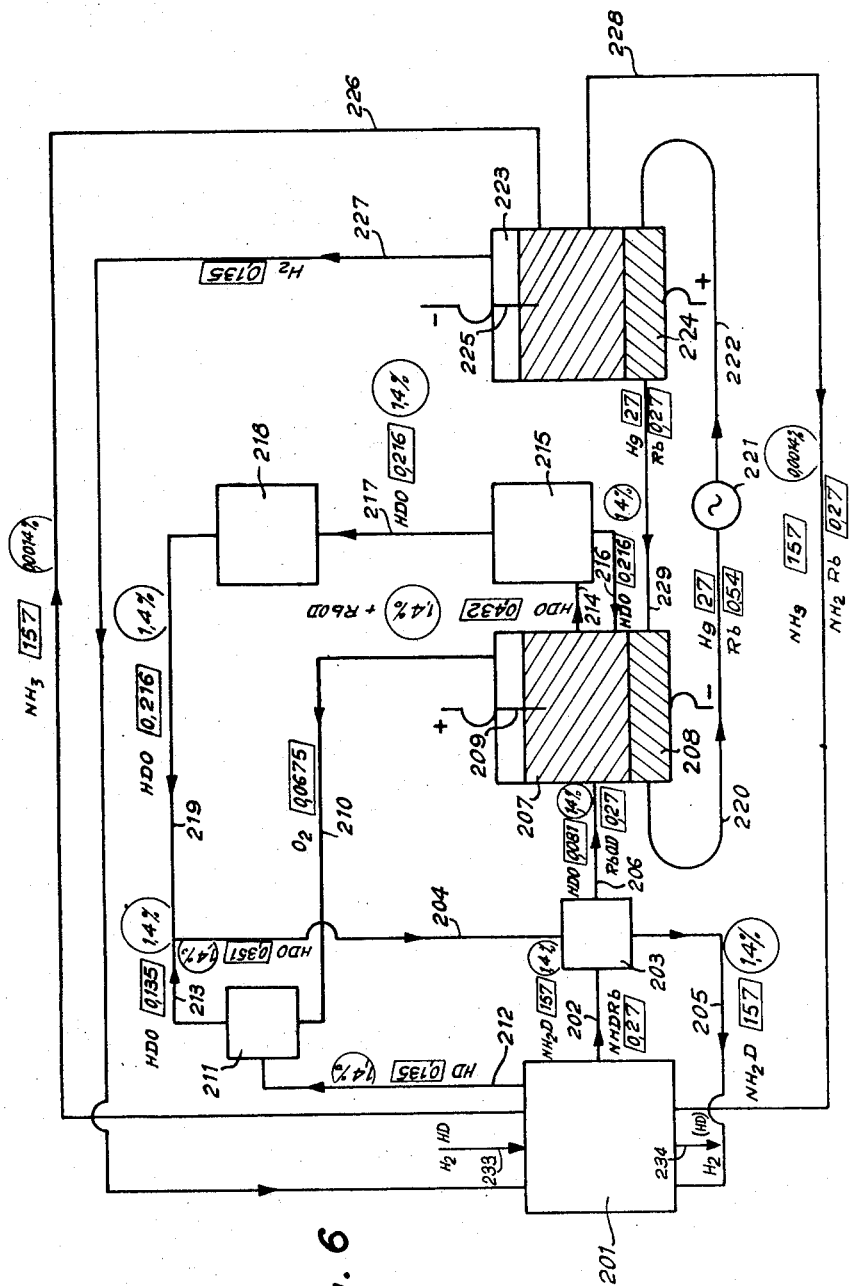

In FIGS. 4, 5 and 6, conforming respectively with the schemes of FIGS. 1, 2 and 3, the feed and drawing-off flows (expressed in kilomoles per hour) of the various apparatus are indicated by the numbers surrounded by parallelograms. The concentrations in deuterium of the hydrogenated products, expressed in $$\frac{\text{deuterium}}{\text{hydrogen}}$$

atomic percentages, are indicated by the numbers surrounded by circles.

*Example 1.*—In this example, illustrated in FIG. 4, hydrogen gas containing deuterium enters enrichment installation 1 through tube 23 and leaves substantially depleted of its deuterium content through tube 24 and there is drawn off through the channel 2 from the isotopic enrichment installation schematically shown by the square 1, 59 kilomoles per hour of ammonia containing 1.4 of deuterium, accompanied by 0.385 kilomole per hour of potassium amide (symbolized by NHDK) in solution. Through the tube 2, the solution of NHDK is sent into an electrolyzer 3 of which the cathode 4 is an amalgam of 1% by weight potassium and the anode 5 is of carbon. A potential difference of 5 volts is applied between the anode 5 of the electrolyzer 3 and the cathode 16 of the electrolyzer 14. Under the effect of this potential difference, the potassium contained in the electrolyte passes into the amalgam forming the cathode 4. There is drawn off from the electrolyzer 3 a solution of NHDK corresponding to a flow of 118 kilomoles per hour of $NH_2D$ and 0.385 kilomole per hour of NHDK which is sent through the tube 6 to an evaporator 7 heated by steam. 59 kilomoles per hour of evaporated ammonia $NH_2D$, freed of its amide, are sent through the tube 8 to a convenient point of the installation 1. There are drawn off through the tube 9 from the evaporator 7, 59 kilomoles per hour of $NH_2D$ and 0.385 kilomole per hour of potassium amide in solution in ammonia. 0.064 kilomole per hour of $N_2$ is released from the electrolyzer 3 and is evacuated through the tube 10. 15 kilomoles per hour of mercury, containing 0.77 kilomole of potassium, are drawn off from the electrolyzer 3 through the tube 11. A pump 12 and the tube 13 send the amlagam and the mercury to a second electrolyzer 14, where it serves this time as the anode 15. The cathode 16 of the electrolyzer 14 is of iron oxide, favouring the formation of potassium amide. Under the effect of the potential difference of 5 volts applied between the cathode 16 and the anode 5 of the electrolyzers 14 and 3, the potassium passes from the amalgam constituting the anode 15 to the ammonia contained in the electrolyzer 14 and it is there converted into potassium amide. 0.192 kilomole per hour of hydrogen, released from the reaction of the potassium on the ammonia, is evacuated through the tube 17. There are sent continuously into the electrolyzer 14 through the tube 18, 59 kilomoles per hour of ammonia of which the atomic concentration in deuterium is 0.0014%. There are drawn off from the electrolyzer 14, 59 kilomoles per hour of ammonia at 0.0014% deuterium and 0.385 kilomole per hour of potassium amide in solution in ammonia, and this solution is sent through the tube 19 to the isotopic enrichment installation 1. 15 kilomoles per hour of mercury containing 0.385 kilomole of potassium amalgam are withdrawn through the tube 20 from the electrolyzer 14 to be sent into the electrolyzer 3 where it is recharged with potassium.

In the two electrolyzers 3 and 14, the conditions of temperature and pressure are the same, namely: temperature 50° C. and pressure 30 kg./cm.² The current density is chosen to be the same in the two electrolytic baths and is equal to 20 amperes per square decimetre.

*Example 2.*—In this example illustrated by FIG. 5, hydrogen gas containing deuterium enters enrichment installation 101 through tube 128 and leaves substantially depleted of its deuterium content through tube 129 and there are drawn off through a tube 102 from the isotopic enrichment installation shown schematically by the square 101, 235 kilomoles per hour of ammonia enriched 100 times in deuterium (concentration 1.4%) and 0.77 kilomole per hour of potassium amide contained in solution in this ammonia. This solution of NHDK arrives into the electrolyzer 103 surrounded by a jacket 123 where a fluid circulates allowing the temperature to be maintained at −19° C., the pressure being 2 kg./cm.² The cathode 104 of this electrolyzer is an amalgam containing 1.5% by weight of potassium. A potential difference of 5 volts is applied between the electrodes 105 and 104 of the electrolyzer 103. Under the effect of this potential difference, the potassium contained in the electrolyte passes into the amalgam forming the cathode 104. The anode 105 is of carbon and the density of the current crossing the electrolytic bath is 15 amperes per square decimetre.

From the electrolyzer 103, there are drawn off through the tube 106 235 kilomoles per hour of $NH_2D$ in vapour form containing 1.4% of deuterium. This ammonia, freed of its amide, is condensed in the condenser 124 and the liquid formed is sent through the tube 108 to the installation 101.

0.128 kilomole per hour of nitrogen is evacuated through the tube 110 from the electrolyzer 103.

20 kilomoles per hour of mercury, containing 1.54 kilomoles of potassium, are taken off from the electrolyzer 103 through the tube 111. A pump 112 and a tube 113 send it to a second electrolyzer 114 where it serves this time as the anode 115. The cathode 116 of the electrolyzer 114 is of nickel; this metal does not sufficiently favour the conversion of the potassium and the ammonia into the amide under the conditions of use here defined, this conversion being ensured by other means as indicated below. Under a potential difference of 5 volts applied between the electrodes 115 and 116 of the electrolyzer 114, the potassium passes from the amalgam constituting the anode 115 to the ammonia contained in the electrolyzer 114. 235 kilomoles per hour of ammonia, relatively poor in deuterium (concentration 0.0014%) are sent continuously into the electrolyzer 114. Due to a slight conversion of the potassium and the ammonia into the amide, 0.025 kilomole per hour of hydrogen is released from the electrolyzer through the tube 117.

Through the tube 119, 235 kilomoles per hour of ammonia having a concentration in deuterium equal to 0.0014%, are drawn off from the electrolyzer 114. This ammonia contains 0.72 kilomole of potassium and 0.05 kilomole of the amide, formed in the electrolyzer 114. This ammonia containing potassium and the amide is sent into a receiver 125, containing a platinum catalyst favouring the formation of potassium amide. From the receiver 125, 0.36 kilomole per hour of hydrogen is evacuated through the tube 126, whilst 235 kilomoles per hour of ammonia with 0.0014% of deuterium and 0.77 kilomole per hour of potassium amide are taken off from the receiver 125 through the tube 127 and sent into the enrichment installation 101. 20 kilomoles per hour of mercury containing 0.77 kilomole of potassium are drawn off from the electrolyzer 114 through the tube 120 and sent into the electrolyzer 123 in order to form the cathode 104.

The density of the current through the bath of the electrolyzer 114 is 30 amperes per square decimetre, the temperature of the bath being maintained at −30° C., under a pressure of 2 kg./cm.²

*Example 3.*—In this example illustrated by FIG. 6, hydrogen gas containing deuterium enters enrichment installation 201 through tube 233 and leaves substantially depleted of its deuterium content through tube 234 and 157 kilomoles per hour of ammonia 100 times enriched in deuterium (concentration 1.4%) and containing 0.27 kilomole of rubidium amide are taken off through the tube 202 from the isotopic enrichment installation shown schematically by the square 201. The solution thus drawn off is led into a mixer-separator 203 where it is put into contact with 0.351 kilomole per hour of water, of which the concentration in deuterium is 1.4%, arriving through the tube 204. In the apparatus 203, the rubidium amide reacts with the water, which is in slight excess with respect to the quantity theoretically necessary. 157 kilomoles per hour of ammonia, freed of its amide, are taken off through the tube 205 and returned to the installation 201. 0.27 kilomole per hour of rubidium hydroxide in solution in 0.081 kilomole of water is led through the tube 206 to the electrolyzer 207. The temperature of the bath of this electrolyzer is 65° C., and the pressure is 2 kg./cm.² The anode 209 is of carbon. The cathode 208 consists of an amalgam containing 1% by weight of rubidium. A potential difference of 6 volts is applied between the electrodes 209 and 225 of the electrolyzers 207 and 223. Under the effect of this potential difference, the rubidium contained in the electrolyte passes into the amalgam constituting the cathode of the electrolyzer 207.

0.0675 kilomole per hour of oxygen is released at the anode 209 of the electrolyzer 207 and is recovered through the tube 210. In the recombination device 211, the oxygen is converted into water, as a result of the introduction of 0.135 kilomole per hour of hydrogen of which the concentration in deuterium is 1.4% and which is led through the tube 212 from the enrichment installation 201. A catalyst with a divided platinum base is employed to permit the combustion reaction of hydrogen in oxygen. 0.135 kilomole per hour of water (concentration in deuterium 1.4%) is then taken off through the tube 213. 0.432 kilomole per hour of water containing 400 grammes per litre of rubidium hydroxide is drawn off through the tube 214 from the electrolyzer 207 and directed to the evaporator 215 where 0.215 kilomole/hour of water is evaporated. The solution of rubidium hydroxide at 800 g./litre thus obtained is returned to the electrolyzer 207 through the tube 216. The evaporated water is recovered through the tube 217 and, after passing into the condenser 218, it leaves through the tube 219. This water is then mixed with the water, coming from the tube 213, a flow equal to 0.135 kilomole per hour from the recombination apparatus 211, to arrive at the mixer-decanter apparatus 203 through the tube 204 where the total flow is 0.351 kilomole per hour and the concentration in deuterium is 1.4%.

27 kilomoles per hour of mercury, containing 0.54 kilomole of rubidium are taken off from the electrolyzer 207 through the tube 220. The pump 221 and the tube 222 send the amalgam to a second electrolyzer 223 where it serves this time as the anode 224. The temperature of the electrolyzer 223 is maintained equal to 15° C. and the pressure is 20 kg./cm.$^2$. The cathode 225 of the electrolyzer 223 is of iron oxide in order to favour the conversion of the rubidium and the ammonia into rubidium amide. Under a potential difference of 6 volts applied between the electrodes 209 and 225 of the electrolyzers 207 and 223, the rubidium passes from the amalgam constituting the anode 224 to the ammonia contained in the electrolyzer 223. A flow equal to 157 kilomoles per hour of ammonia poor in deuterium (concentration 0.0014%) is sent to the electrolyzer 223 through the tube 226. A quantity equal to 0.135 kilomole per hour of hydrogen is released at the cathode of this electrolyzer and is evacuated through the tube 227 to the enrichment installation 201. Through the tube 228, 157 kilomoles per hour of ammonia poor in deuterium (0.0014%) and charged with rubidium amide are taken off from the electrolyzer 223 in order to be sent to the enrichment installation 201. The quantity of rubidium amide entrained by this ammonia is equal to 0.27 kilomole per hour.

27 kilomoles per hour of mercury containing 0.27 kilomole of rubidium amalgam are drawn off from the electrolyzer 223 and sent through the tube 229 to the electrolyzer 207 where it is recharged with rubidium.

The current density is chosen to be the same for the two electrolytic baths of the electrolyzers 207 and 223 and equal to 25 amperes per square decimetre.

We claim:

1. In a process for enriching ammonia in deuterium by contacting a solution of an alkali metal amide catalyst in ammonia with hydrogen gas containing deuterium in an enrichment zone thereby enriching both said ammonia and said alkali metal amide catalyst in deuterium by isotopic exchange, the improvement of removing the deuterium-rich alkali metal amide catalyst from said enrichment zone, transferring the alkali metal from said deuterium-rich alkali metal amide catalyst into an alkali metal amalgam by electrolysis in a first electrolyzer using said amalgam as a cathode, removing the alkali metal from said amalgam by electrolysis in a second electrolyzer in the presence of liquid ammonia of low deuterium content using the amalgam as an anode, forming alkali metal amide of low deuterium content from said ammonia of low deuterium content and said alkali metal and introducing said alkali metal amide of low deuterium content into said enrichment zone.

2. The process of claim 1 wherein the anode of said first electrolyzer is carbon.

3. The process of claim 1 wherein the deuterium-rich alkali metal amide removed from said enrichment zone is dissolved in liquid ammonia rich in deuterium and the concentration of alkali metal amide remaining in the ammonia after electrolysis in said first electrolyzer is increased by evaporating a portion of the ammonia and the concentrated solution is again subjected to electrolysis in said first electrolyzer to transfer additional alkali metal into said amalgam.

4. The process of claim 1 wherein the deuterium-rich alkali metal amide removed from said enrichment zone is dissolved in liquid ammonia rich in deuterium and heat is applied to said first electrolyzer to thereby form gaseous ammonia which is removed from said first electrolyzer.

5. In a process for enriching ammonia in deuterium by contacting a solution of an alkali metal amide in ammonia with hydrogen gas containing deuterium in an enrichment zone thereby enriching both said ammonia and said alkali metal amide catalyst in deuterium by isotopic exchange, the improvement of removing the deuterium-rich alkali metal amide catalyst from said enrichment zone, reacting said alkali metal amide with a slight excess of deuterium-rich water to form alkali metal hydroxide which dissolves in the excess water, separating ammonia from the alkali metal hydroxide solution so formed, transferring the alkali metal from said alkali metal hydroxide into an alkali metal amalgam by electrolysis in a first electrolyzer using said amalgam as a cathode, removing the alkali metal from said amalgam by electrolysis in a second electrolyzer in the presence of liquid ammonia of low deuterium content using the amalgam as an anode and forming alkali metal amide of low deuterium content from said alkali metal and said ammonia of low deuterium content and introducing said alkali metal amide of low deuterium content into said enrichment zone.

References Cited by the Examiner
UNITED STATES PATENTS

| 2,315,830 | 4/43 | Vingee et al. | 204—59 |
| 2,750,281 | 6/56 | Vanharen et al. | 204—105 |

JOHN H. MACK, *Primary Examiner.*

JOHN R. SPECK, *Examiner.*